United States Patent
Radermacher et al.

(10) Patent No.: US 11,680,837 B2
(45) Date of Patent: Jun. 20, 2023

(54) WATER METER AND METHOD FOR FASTENING A WATER METER TO A WATER LINE

(71) Applicant: GROHE AG, Hemer (DE)

(72) Inventors: Daniel Radermacher, Duesseldorf (DE); Bert Depiere, Wakkerzeel (BE); Bastian Schubert, Duesseldorf (DE)

(73) Assignee: GROHE AG, Hemer (DE)

( * ) Notice: Subject to any disclaimer, the term of this patent is extended or adjusted under 35 U.S.C. 154(b) by 54 days.

(21) Appl. No.: 17/220,118

(22) Filed: Apr. 1, 2021

(65) Prior Publication Data
US 2021/0310847 A1    Oct. 7, 2021

(30) Foreign Application Priority Data
Apr. 1, 2020    (DE) .......................... 102020108989.9

(51) Int. Cl.
  *G01F 15/18*    (2006.01)
  *G01D 4/02*    (2006.01)

(52) U.S. Cl.
  CPC ............. *G01F 15/185* (2013.01); *G01D 4/02* (2013.01)

(58) Field of Classification Search
  CPC ........ G01F 15/185; G01F 1/662; G01F 15/18; G01D 4/02; G01D 11/30; E03B 7/072
  See application file for complete search history.

(56) References Cited

U.S. PATENT DOCUMENTS

| | | | |
|---|---|---|---|
| 4,286,470 A | 9/1981 | Lynnworth | |
| 4,327,760 A * | 5/1982 | Lancaster | G01F 15/185 73/201 |
| 9,581,477 B2 * | 2/2017 | Scharnitzky | G01F 15/18 |
| 10,107,786 B2 * | 10/2018 | Fan | G01F 1/662 |
| 2013/0080081 A1 * | 3/2013 | Dugger | G01F 15/063 73/861.25 |
| 2020/0326216 A1 * | 10/2020 | Sarkissian | G01F 15/007 |

FOREIGN PATENT DOCUMENTS

| | | | | |
|---|---|---|---|---|
| CA | 2506269 C | * | 8/2012 | .......... B01D 1/0035 |
| DE | 30 38 975 | | 5/1981 | |
| DE | 10 2007 019 689 | | 10/2008 | |
| DE | 10 2008 034 411 | | 1/2010 | |
| EP | 3 588 017 | | 1/2020 | |
| JP | 4330864 B2 | * | 9/2009 | ............... G01F 1/22 |

OTHER PUBLICATIONS

Ultrasonic flow meter, dated Nov. 19, 2020, available at https://de.wikipedia.org/wiki/Ultrashall-Durchflussmesser, with English language translation.

* cited by examiner

*Primary Examiner* — Francis C Gray
(74) *Attorney, Agent, or Firm* — Wenderoth, Lind & Ponack, L.L.P.

(57) ABSTRACT

A water meter (1) comprising:
  a volume flow-measuring device (2) by means of which a volume flow of a liquid flowing through a water pipe (3) can be measured from outside the water pipe (3); and
  a clamping device (4) by means of which the water meter (1) can be clamped to the water pipe (3).
In addition, a method for attaching a water meter (1) to a water pipe (3).

12 Claims, 1 Drawing Sheet

WATER METER AND METHOD FOR FASTENING A WATER METER TO A WATER LINE

Figure 1:
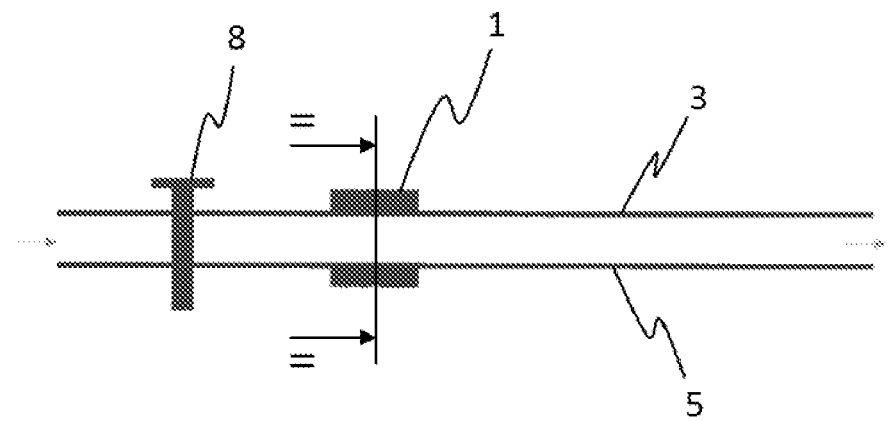

This application claims priority to German Patent Application No. 102020108989.9, filed Apr. 1, 2020, which is incorporated by reference herein in its entirety.

The present invention relates to a water meter and a method for fastening a water meter to a water pipe. Such water meters serve in particular to determine the water consumption of at least one consumption unit, such as a residential building, business building, apartment or hotel room.

Fastening a water meter to a water pipe routinely involves a high degree of installation work. This applies in particular in the event that water meters need to be exchanged or replaced. When exchanging a water meter, the water line must regularly be closed and/or cut, thereby possibly causing an interruption in the water supply to the at least one consumption unit. In addition, the replacement must be performed by a trained installer, which can incur high installation costs.

It is therefore the task of the invention to, at least partially, solve the problems described with reference to the prior art and, in particular, to specify a water meter that can be fastened to a water pipe with less installation effort. In addition, it is also intended to specify a method for fastening a water meter to a water pipe, with the method allowing the water meter can be fastened to the water pipe with less installation effort.

These tasks are solved with a water meter and a method according to the features of the independent patent claims. Further advantageous embodiments of the invention are specified in the dependent patent claims. It should be noted that the features listed individually in the dependent patent claims can be combined with one another in any technologically meaningful manner and define further embodiments of the invention. In addition, the features stated in the patent claims are further specified and explained in the description, wherein further preferred embodiments of the invention are presented.

This is facilitated by a water meter that comprises at least the following:
  a volume flow-measuring device by means of which a volume flow of a liquid flowing through the water pipe can be measured from outside the water pipe; and
  a clamping device by means of which the water meter can be clamped to the water pipe.

The water meter is used in particular for determining and/or billing the water consumption of at least one consumer or at least one consumption unit, such as a residential building, business building, apartment or hotel room. For this purpose, the water meter has a volumetric flow-measuring device by means of which a volumetric flow of a liquid flowing through the water pipe can be measured from outside the water pipe. "From outside" can mean, in particular, that the volumetric flow measuring device does not have or does not require physical contact with the liquid or the water in the water pipe in order to determine the volumetric flow. In order to meet legal requirements, the water meter may comply with appropriate (standard measurement) standards, in particular for billing purposes. The volume flow-measuring device may be connected to a water meter controller, which may in particular comprise a microprocessor. The controller may also be designed as an (external) electronic device, for example, of the type of an electronic reader, smartphone, computer or (internet) server (cloud server). The water meter and/or the controller may be calibratable to measure and/or calculate the volumetric flow rate. The calibration may be based on at least one algorithm, which, in particular, takes into account at least one parameter, such as the age of the installation of the water meter, pipe material of the water pipe, pipe thickness of the water pipe (inner and/or outer diameter) and/or the liquid pressure of the liquid in the water pipe. The water meter and/or controller may be configurable to measure and/or calculate the flow rate. The configuration may be provided taking into account or on the basis of at least one of the aforementioned parameters. By means of the controller, the water consumption or the water volume that has been consumed by the at least one consumer and/or the at least one consumption unit within a certain period of time can be determined, in particular on the basis of measured values of the volume flow measuring device. The water line connects the consumer and/or the consumption unit in particular to a water source, such as a public water supply network. The water consumption can, for example, be displayable on the water meter. In particular, the water line can have a valve upstream of the water meter, by means of which the water line can be shut off. However, in an area downstream of the water meter, in particular no valve is required within the water pipe. "Inside the water pipe" in this context means in particular in an area that is not a (longitudinal) end of the water pipe.

Furthermore, the water meter comprises a clamping device by means of which the water meter can be clamped to the water pipe. This can mean, in particular, that the water meter is not (directly) screwed to the water pipe and/or connected to a longitudinal end of the water pipe. In particular, the water meter can be fastened to the water pipe exclusively by means of the clamping device. Due to the clamping device, the water meter is, in particular, immovable on the water pipe or held firmly in a certain position on the water pipe. The clamping device may, for example, comprise at least one clamping jaw that, in particular, embraces the water pipe at least partially. Furthermore, the clamping device may, for example, comprise a (particularly flexible) clamping element, for example in the manner of a belt, (rubber) band or chain, that extends around the water pipe after the water meter has been fastened to the water pipe. The clamping element allows for the water meter to be fastened to the water pipe with minimal installation effort. In particular, the water supply does not have to be interrupted and the water pipe does not have to be cut.

The volume flow of the liquid can be measured by the volume-flow measuring device by means of ultrasound, vibration measurement, temperature measurement and/or noise measurement. A measurement can thus be performed in particular through an outer wall of the water pipe. Furthermore, the measurement of the volumetric flow can be performed taking into account at least one parameter, such as the age of the installation of the water meter, the pipe material of the water pipe, the pipe thickness of the water pipe (inner and/or outer diameter) and/or the liquid pressure of the liquid in the water pipe. Furthermore, in order to measure the volume flow of the liquid by means of ultrasound, vibration measurement, temperature measurement and/or noise measurement, the water meter and/or the control system can be calibrated and/or configured taking into account the aforementioned parameters and/or using the at least one algorithm.

The water meter can be clamped to a peripheral surface of the water pipe by means of the clamping device.

The clamping device can be secured against unauthorized release. This may require, for example, a key or a special tool to release the clamping device. Furthermore, the water meter or clamping device can be secured against unauthorized removal, for example, by means of a seal. This allows for manipulations to be detected and/or proven.

An alarm signal can be emitted by the water meter in the event of an unauthorized disconnection of the water meter from the water line. For this purpose, the water meter can, for example, have a signal transmitter such as a loudspeaker or a signal light or send the alarm signal to an electronic device. The electronic device may be, in particular, an electronic reading device, a smartphone, a computer or an (internet) server (cloud server). For this purpose, the water meter can be connected to the electronic device, for example, via radio, router and/or modem. For example, the connection can be provided via Ethernet, WLAN, Bluetooth, ZigBee, cellular, LTE, 4G, 5G, NBlot, M-Bus, etc. In addition, the water meter may include a sensor with which to detect any unauthorized disconnection of the water meter. In particular, the water meter and/or the sensor may send the alarm signal to the electronic device.

By means of the water meter, the water consumption of the liquid can be transmittable to an electronic device. The electronic device can, in particular, be an electronic reader, a smartphone, a computer or an (internet) server (cloud server). For this purpose, the water meter can be connected to the electronic device via radio, router and/or modem, for example. The connection can be provided, for example, via Ethernet, WLAN, Bluetooth, ZigBee, cellular, LTE, 4G, 5G, NBlot, M-Bus, etc.

The water meter can be designed as multiple parts to form the clamping device. For example, the water meter can comprise a first part of the water meter and a second part, which can be connected to each other, in particular, via a hinge. The two parts may, in particular, be at least partially bowl-shaped and/or have at least one, in particular at least partially round, recess for the water pipe. When fixing the water meter, the two parts can be arranged in particular on two, in particular, opposite sides of the water conduit and can be connected at an end located on the opposite side of the hinge by a fastening means, for example, a screw. This allows the water pipe to be clamped between the two parts in particular.

The water meter can be set up to analyze measured values from the volume flow-measuring device. In particular, the control system of the water meter can be set up to detect unusual water consumption and/or leaks in the water pipe by analyzing measured values from the volumetric flow meter. Alternatively, the water meter can also send the measured values of the volume flow-measuring device to the electronic device for analysis. In case of unusual water consumption and/or leakages, an alarm signal can be sent by the water meter and/or the electronic device. The water meter and/or the volume flow metering device may serve as a primary application to account for water consumption and as a secondary application to detect unusual water consumption. Furthermore, by means of the water meter and/or the volume flow-measuring device, a flow direction of the liquid through the water pipe can be detected or determined.

The water meter can have at least one battery for power supply. This renders the water meter, in particular, independent of a wired energy network.

Pursuing a further aspect, a method is also being proposed for fastening a water meter to a water pipe, in which the water meter is fastened to the water pipe with the aid of a clamp connection. The water meter is in particular a water meter described herein or a water meter according to the invention.

For further details of the method, please refer in full to the description of the water meter.

The invention and the technical environment are explained in more detail hereinbelow with references to the figures. It should be noted that the figures show a particularly preferred embodiment of the invention, but without being limited thereto. Identical components are given the same reference signs in the figures. Shown as examples and diagrams:

FIG. 1: A water pipe with a water meter in a longitudinal section; and

Figure 2:
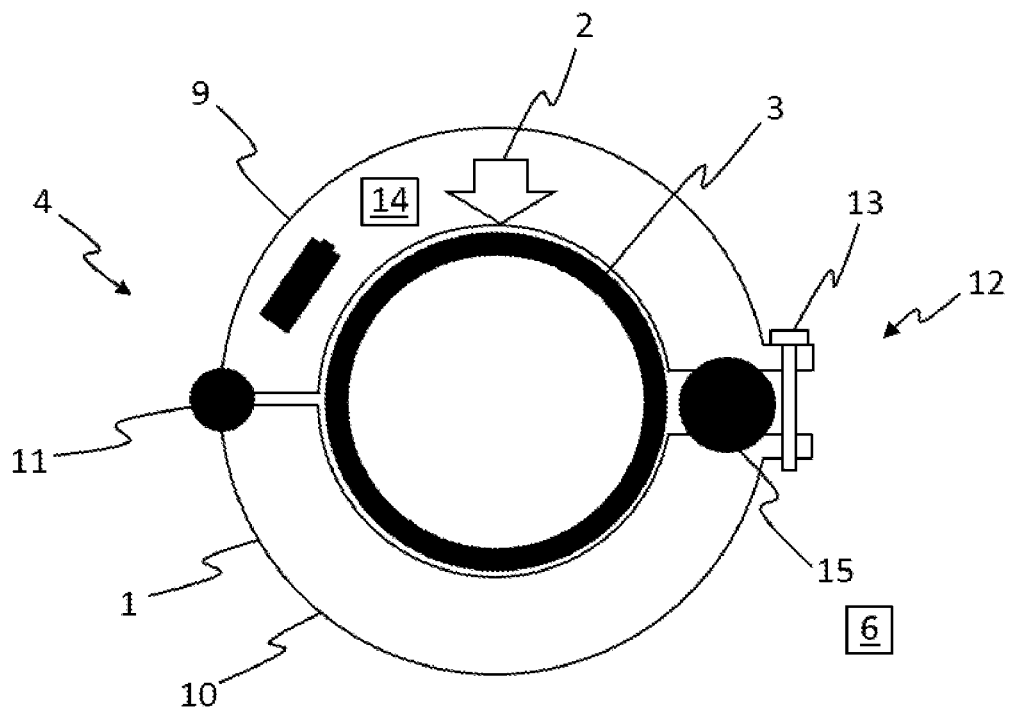

FIG. 2: Water pipe with the water meter in a cross section.

FIG. 1 shows a water line (3) with a water meter (1) in longitudinal section. The water meter (1) is clamped to a circumferential surface (5) of the water line (3) by a clamping device (4) shown in FIG. 2) so that the water meter (1) cannot be moved on the water line (3). Upstream of the water meter (1), a valve (8) is arranged in the water line (3), by means of which the water line (3) can be closed. The valve (8) could also be arranged downstream of the water meter (1) in the water line (3). In addition, no valve (8) could also be arranged in the water line (3) and/or only at an end of the water line (3) not shown here.

FIG. 2 shows the water pipe (3) with the water meter (1) in a cross section along the line of intersection II-II shown in FIG. 1. To form a clamping device (4), the water meter (1) is formed by a first part (9) and a second part (10), which are connected to each other by a hinge (11). For fixing the water meter (1) to the water pipe (3), the ends (12) of the parts (9), (10) of the water meter (1) located opposite of the hinge (11) are connected by a screw (13) so that the water meter (1) is clamped to the water pipe (3). A seal (15) is over the ends (12) of the parts (9), (10) of the water meter (1). The water meter (1) comprises a volume flow-measuring device (2) by means of which a volume flow of a liquid flowing through the water pipe (3) can be measured from outside the water pipe (3). For this purpose, the volume flow-measuring device 2 is connected to a controller (14) of the water meter (1), by means of which the water consumption of a consumption unit not shown here can be determined. The controller (14) can be supplied with energy via a battery (7) of the water meter (1). The measured water consumption can be displayed by the controller (14) on a display of the water meter not shown here and/or sent to an electronic device (6), for example, by radio and/or via an internet gateway.

The present invention allows for a water meter to be fastened to a water pipe with minimal installation effort.

List Of Reference Signs

1 Water meter
2 Volume flow-measuring device
3 Water pipe
4 Clamping device
5 Peripheral surface
6 Electronic device
7 Battery
8 Valve
9 First part
10 Second part
11 Hinge
12 Ends
13 Screw
14 Controller
15 Seal

The invention claimed is:

1. A water meter (1), comprising:
   a volume flow measuring device (2) that measures a volume flow of a liquid flowing through a water pipe (3) from outside the water pipe (3); and
   a clamping device (4) that clamps the water meter (1) to the water pipe (3) and secures unauthorized release of the water meter (1) from the water pipe (3) by requiring a key or a special tool to release the water meter (1) from the water pipe (3).

2. The water meter (1) according to claim 1, wherein the volume flow of the liquid is measured by ultrasound, vibration measurement or noise measurement.

3. The water meter (1) according to claim 1, wherein the clamping device (4) clamps the water meter (1) to a circumferential surface (5) of the water pipe (3).

4. The water meter (1) according to claim 1, wherein an alarm signal is emitted by the water meter (1) in the event of the unauthorized release of the water meter (1) from the water pipe (3) without the key or the special tool.

5. The water meter (1) according to claim 1, wherein the measured volume flow of the liquid flowing through the water pipe (3) is transmitted to an electronic device (6) by the water meter (1).

6. The meter (1) according to claim 1, wherein the clamping device (4) comprises multiple parts.

7. The water meter (1) according to claim 1, wherein the water meter (1) analyzes the measured volume flow of the liquid flowing through the water pipe (3).

8. The water meter (1) according to claim 1, further comprising at least one battery (7) as a power supply.

9. A method of fastening a water meter (1) to a water pipe (3), comprising:
   clamping a volume flow measuring device (2) that measures a volume flow of a liquid flowing through a water pipe (3) from outside the water pipe (3) to a clamping device (4) to clamp the water meter (1) to the water pipe (3), and
   securing unauthorized release of the water meter (1) from the water pipe (3) by requiring a key or a special tool to release the water meter (1) from the water pipe (3).

10. The water meter (1) according to claim 1, further comprising a seal (15), wherein the seal (15) is broken in the event of the unauthorized release of the water meter (1) from the water pipe (3).

11. The water meter (1) according to claim 1, wherein the clamping device (4) comprises a first part (9) and a second part (10) connected with a hinge (11).

12. The water meter (1) according to claim 11, wherein ends (12) of the first part (9) and the second part (10) located opposite to the hinge (11) are connected with a screw (13).

* * * * *